(12) United States Patent
Patel et al.

(10) Patent No.: US 12,544,193 B2
(45) Date of Patent: Feb. 10, 2026

(54) ORTHODONTIC APPLIANCE AND METHOD OF USE

(71) Applicant: Ortho Organizers, Inc., Carlsbad, CA (US)

(72) Inventors: Nihir Patel, San Marcos, CA (US); Tejdeep Singh Riat, San Marcos, CA (US); Mark A. Payne, Oceanside, CA (US)

(73) Assignee: Ortho Organizers, Inc., Carlsbad, CA (US)

( * ) Notice: Subject to any disclaimer, the term of this patent is extended or adjusted under 35 U.S.C. 154(b) by 0 days.

(21) Appl. No.: 17/558,972

(22) Filed: Dec. 22, 2021

(65) Prior Publication Data
US 2022/0192791 A1 Jun. 23, 2022

Related U.S. Application Data

(60) Provisional application No. 63/130,190, filed on Dec. 23, 2020.

(51) Int. Cl.
*A61C 7/20* (2006.01)
*A61C 7/28* (2006.01)
*A61C 7/36* (2006.01)

(52) U.S. Cl.
CPC .......... *A61C 7/20* (2013.01); *A61C 7/28* (2013.01); *A61C 7/36* (2013.01)

(58) Field of Classification Search
CPC .... A61C 7/00; A61C 7/08; A61C 7/10; A61C 7/145; A61C 7/12; A61C 7/14;
(Continued)

(56) References Cited

U.S. PATENT DOCUMENTS 3,618,214 A * 11/1971 Armstrong ............... A61C 7/36
267/179
3,936,938 A * 2/1976 Northcutt ................ A61C 7/12
433/21
(Continued)

FOREIGN PATENT DOCUMENTS

JP 2001161715 A 6/2001
WO 2015157472 A1 10/2015
WO WO-2019000074 A1 * 1/2019 ............... A61C 7/00

OTHER PUBLICATIONS

Elgiloy. Elgiloy Specialty Metals—Wire Products. https://www.elgiloy.com/assets/1/6/Wire_Data_Sheet_-_Elgiloy.pdf. 2018). (Year: 2018).*

(Continued)

*Primary Examiner* — Heidi M Eide
*Assistant Examiner* — Lina Faraj
(74) *Attorney, Agent, or Firm* — Fulwider Patton LLP

(57) ABSTRACT

An elongated member is used to create tension to move teeth en masse to correct Class II and Class III malocclusions. The elongated member has a constant force spring that, when stretched, provides tension along the elongated member. A mesial end of the elongated member is attached to a bridge assembly which is attached to a row of teeth, and a distal end of the elongated member is attached to an anchor. The spring member provides a constant tension which moves the bridge assembly, and hence the row of teeth, a precalibrated distance.

24 Claims, 19 Drawing Sheets

(58) Field of Classification Search
CPC ........... A61C 7/141; A61C 7/143; A61C 7/22; A61C 7/303; A61C 7/36
See application file for complete search history.

(56) References Cited

U.S. PATENT DOCUMENTS

| | | | | |
|---|---|---|---|---|
| 4,315,739 | A * | 2/1982 | Cain | A61C 7/00 267/168 |
| 4,459,263 | A | 7/1984 | Prasad | |
| 4,795,342 | A * | 1/1989 | Jones | A61C 7/36 433/22 |
| 5,046,948 | A * | 9/1991 | Miura | A61C 7/12 433/21 |
| 5,074,784 | A * | 12/1991 | Sterrett | A61C 7/36 433/21 |
| 5,120,218 | A | 6/1992 | Hanson | |
| 5,376,001 | A * | 12/1994 | Tepper | A61C 7/00 433/6 |
| 5,545,037 | A * | 8/1996 | Takeshi | A61C 7/22 433/21 |
| 5,620,320 | A * | 4/1997 | Luse | A61C 7/06 433/21 |
| 5,897,313 | A * | 4/1999 | Cleary | A61C 7/36 433/18 |
| 5,944,518 | A * | 8/1999 | Sabbagh | A61C 7/36 433/19 |
| 5,964,588 | A * | 10/1999 | Cleary | A61C 7/36 433/18 |
| 6,053,730 | A * | 4/2000 | Cleary | A61C 7/36 433/18 |
| 6,328,562 | B1 * | 12/2001 | Sirney | A61C 7/36 433/19 |
| 9,867,681 | B2 | 1/2018 | Radmall et al. | |
| 2002/0025502 | A1 * | 2/2002 | Williams | A61C 7/10 433/7 |
| 2002/0041820 | A1 | 4/2002 | Prasad | |
| 2003/0039939 | A1 * | 2/2003 | Farzin-Nia | A61C 7/20 433/21 |
| 2006/0046225 | A1 * | 3/2006 | Cacchiotti | A61C 7/36 433/22 |
| 2009/0197216 | A1 * | 8/2009 | Miller | A61C 7/36 433/19 |
| 2010/0151402 | A1 * | 6/2010 | Williams | A61C 7/282 433/7 |
| 2011/0269094 | A1 * | 11/2011 | Shearer | A61C 7/36 433/24 |
| 2012/0058444 | A1 * | 3/2012 | Allesee | A61C 7/22 433/21 |
| 2013/0177861 | A1 * | 7/2013 | Hayes | A61C 7/20 433/24 |
| 2014/0230829 | A1 | 8/2014 | Rogers | |
| 2014/0255866 | A1 | 9/2014 | Faust et al. | |
| 2015/0118633 | A1 * | 4/2015 | Carriere Lluch | A61C 7/12 433/18 |
| 2015/0216716 | A1 * | 8/2015 | Anitua Aldecoa | A61C 7/36 29/428 |
| 2015/0257858 | A1 * | 9/2015 | Dischinger | A61C 7/36 433/24 |
| 2015/0327957 | A1 * | 11/2015 | Faust | A61C 7/20 433/24 |
| 2016/0000531 | A1 * | 1/2016 | Radmall | A61C 7/36 433/17 |
| 2016/0220331 | A1 * | 8/2016 | Johnston | A61C 7/18 |
| 2017/0128170 | A1 * | 5/2017 | Dischinger | A61C 7/12 |
| 2018/0116767 | A1 * | 5/2018 | Abels | A61C 7/36 |
| 2019/0307533 | A1 * | 10/2019 | Sabbagh | A61C 7/30 |
| 2019/0351154 | A1 * | 11/2019 | Shah | A61M 5/31528 |
| 2020/0163742 | A1 * | 5/2020 | Suriano | A61C 7/14 |
| 2020/0352682 | A1 * | 11/2020 | Voudouris | A61C 7/285 |
| 2021/0045911 | A1 * | 2/2021 | Veis | A61C 7/08 |
| 2022/0125555 | A1 * | 4/2022 | Carriere Lluch | A61C 7/14 |
| 2022/0346918 | A1 * | 11/2022 | Suriano | A61C 7/36 |

OTHER PUBLICATIONS

International Search Report, May 17, 2022, 4 pages, from counterpart application PCT/US21/64863.
Extended European Search Report issued Oct. 14, 2024, 10 pp.

* cited by examiner

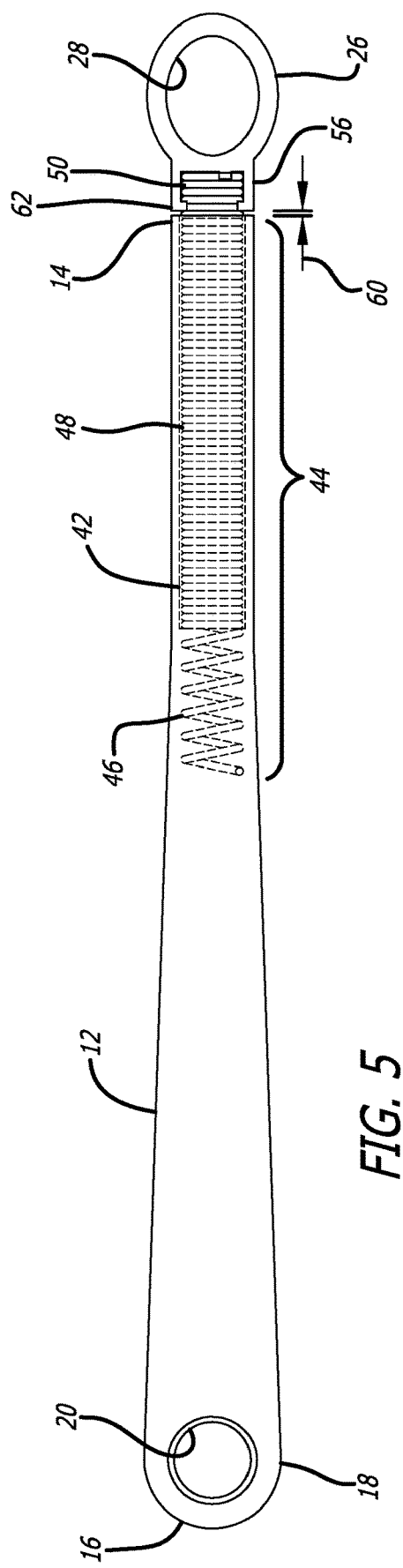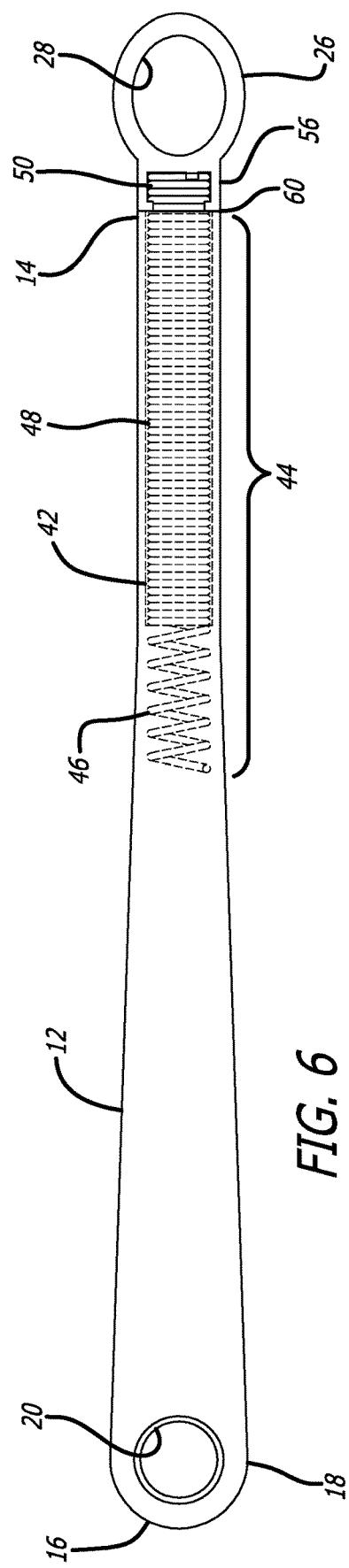
FIG. 5
FIG. 6

ORTHODONTIC APPLIANCE AND METHOD OF USE

BACKGROUND

The incorrect positioning of teeth or the misalignment of teeth between the upper dental arch and lower dental arch are known as malocclusions. Dental health professionals generally categorize malocclusions into three classifications designated as Class I, Class II, and Class III. Class I malocclusions are those in which the individual teeth are not aligning well with each other and/or corresponding teeth in the opposite jaw, for example due to spacing or crowding problems. Class II malocclusions relate to those cases in which the upper jaw is not properly positioned relative to the lower jaw, resulting in the upper teeth projecting in front of the lower teeth. The excess horizontal overlap of upper teeth to the lower teeth in this type of malocclusion is typically referred to as excess overbite. Class III malocclusions occur when the lower jaw is positioned too far forward with respect to the upper jaw. This type of malocclusion is typically referred to as an underbite.

The most frequently treated type of malocclusion is the Class I malocclusion. Historically, practitioners treated Class I malocclusions by applying braces to a patient's teeth. This involves placing brackets on individual teeth and connecting the brackets with an archwire to guide movement of the teeth into desired alignment.

While fixed braces are suitable for correcting Class I malocclusions, the devices cannot be used alone to correct Class II and Class III malocclusions. Rather, additional orthodontic appliances must be used to force the jaw into its proper bite position by forcing the jawbones and muscles to physically adjust to the proper bite position. For patients wearing fixed braces, the brace hardware can provide an architectural platform for attaching springs, rubber bands, or other appliances that apply a force to move the upper jaw and lower jaw into proper relative alignment.

As with all orthodontic treatment regimes, there is a continued focus on addressing Class II and Class III malocclusions in not only a therapeutically effective manner, but also in a manner that yields treatment and orthodontic practice efficiencies. In the latter regard, orthodontic appliances that may be readily installed, adjusted, replaced and removed yield numerous advantages. Many prior art devices, however, rely on the patient to maintain system compliance. For example, during an orthodontic treatment, the patient is required to change rubber bands after a certain period of time because the band's elastic strength drops significantly over time and it stops applying the required force for the tooth movement. Some patients who do not comply with the procedure of changing the rubber bands are known as non-compliant patients. Because of their noncompliance the tooth movement stops or slows down resulting in stalling the orthodontic treatment. The present invention will convert existing products that rely on compliance to an assembly that does not rely on patient compliance.

SUMMARY OF THE INVENTION

In one embodiment of the invention, an orthodontic appliance includes an elongated elastic member having a distal end and a mesial end, and a first retaining member attached to the distal end, which has a first aperture for removable attachment to an anchor. A second retaining member is attached to the mesial end of the elongated elastic member and has a second aperture for removable attachment to a bridge assembly. The bridge assembly is attached to several teeth so that the teeth will move en masse. A tension is created on the elongated elastic member being stretched axially when the first retaining member is removably attached to the anchor and the second retaining member is removably attached to the bridge assembly. The elongated elastic device is precalibrated to provide a constant tension force and is preferably formed from a polymer having elastic properties. The elongated elastic member is preprogrammed to stop at a prescribed distance of movement. Movement of the elongated elastic member causes the bridge assembly to move the teeth en masse to correct for Class II and Class III malocclusions.

In another embodiment, an orthodontic appliance includes an elongated member having a distal end and a mesial end. A first retaining member is attached to the distal end of the elongated member and has an aperture for engaging an anchor. A second retaining member on the mesial end of the elongated member has a second aperture for engaging a bridge assembly. The bridge assembly is attached to several teeth so that the teeth will move en masse. A spring member associated with the elongated member provides tension by pulling the first retaining member and the second retaining member toward each other and thereby applying the tension to the anchor and the bridge assembly. Preferably, the spring member is precalibrated to provide a constant tension and preferably is formed from a superelastic alloy such as Nitinol. The elongated member is preprogrammed to stop at a prescribed distance of movement. Movement of the elongated member causes the bridge assembly to move the teeth en masse to correct for Class II and Class III malocclusions.

BRIEF DESCRIPTION OF THE DRAWINGS

The following drawings are illustrative of particular embodiments of the present invention and therefore do not limit the scope of the invention. The drawings are not to scale and are intended for use in conjunction with the explanations in the following detailed description. Embodiments of the present invention will hereinafter be described in conjunction with the appended drawings. The drawings illustrate generally, by way of example, but not by way of limitation, various embodiments discussed in the present document.

FIG. 5 is a plan view of an elongated member having a spring mounted thereon, and depicting a gap between the spring member and a retaining member.

FIG. 6 is a plan view of the elongated member of FIG. 5 depicting the gap between the spring member and the retaining member being closed.

DETAILED DESCRIPTION OF THE PREFERRED EMBODIMENTS

Figure 1:
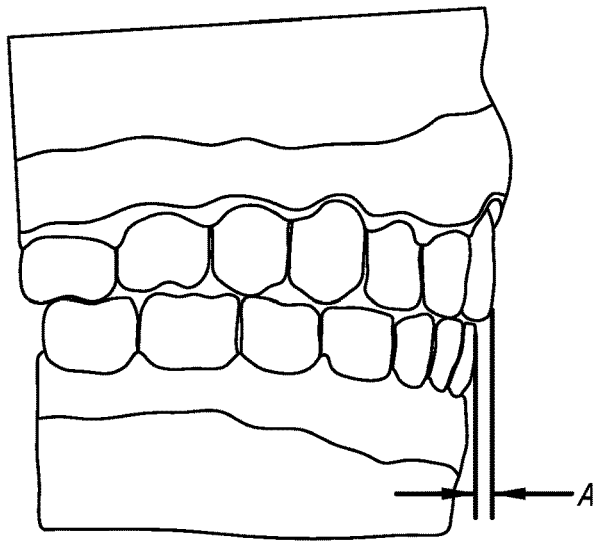
FIG. 1 illustrates the normal alignment of mandibular and maxillary jaws.
Figure 2:
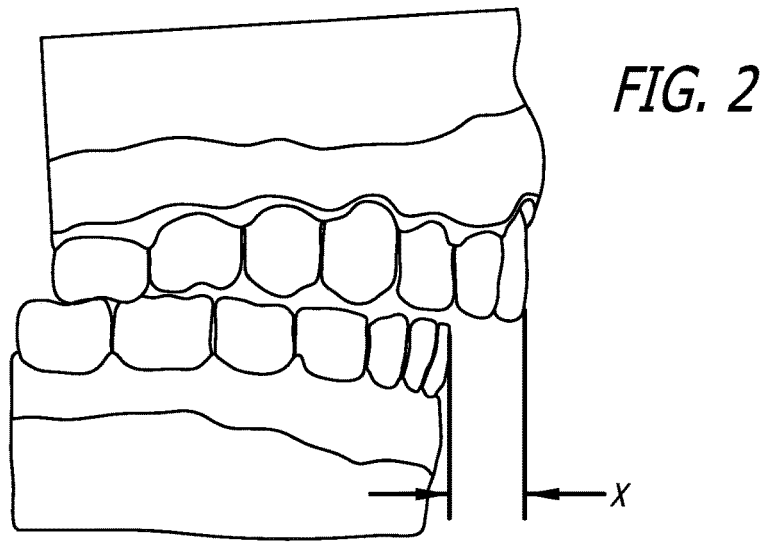
FIG. 2 illustrates the orientation of mandibular and maxillary jaws relative to each other in a Class II malocclusion.
Figure 3:
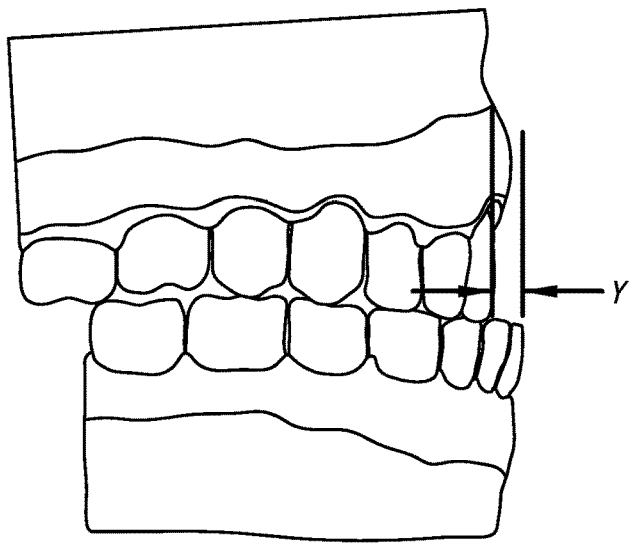
FIG. 3 illustrates the orientation of mandibular and maxillary jaws relative to each other in a Class III malocclusion.

Embodiments of the present invention include an orthodontic appliance assembly that is attached to the maxillary and mandibular jaws to apply a moving force to the mandibular jaw to reposition it relative to the maxillary jaw to correct a patient's bite. The present invention is particularly useful in treating Class II or Class III malocclusions. As shown in FIG. 1, the teeth and the maxillary and mandibular jaws are positioned in normal alignment. FIG. 2 illustrates the orientation of mandibular and maxillary jaws relative to each other in a Class II malocclusion. FIG. 3, illustrates the orientation of the mandibular and maxillary jaws relative to each other in a Class III malocclusion.

In keeping with the present invention, as shown in FIGS. 4-8B, an orthodontic appliance assembly 10 (sometimes referred to herein as a non-compliant motion device) includes an elongated member 12 having a distal end 14 and mesial end 16. A first retaining member 18 is attached to the mesial end 16 of the elongated member and has a first aperture 20 for engaging a bridge assembly 30. A second retaining member 26 on the distal end 14 of the elongated member 12 has a second aperture 28 for engaging an anchor 22. The anchor 22 is typically attached to either an upper molar (upper 6 or upper 7) or a lower molar (lower 6 or lower 7). The anchor 22 typically is attached by adhesives in a known manner and has a hook 24 for engaging the second aperture 28 of the second retaining member 26. The bridge assembly 30 is a structural member known in the prior art for use in treating Class II and Class III malocclusions. For example, one prior art bridge assembly sold commercially is the CARRIERE® MOTION 3D™ Class III appliance, sold by Henry Schien Orthodontics, Carlsbad, California. The bridge assembly 30 comprises an elongated rod 32 having a first end 34 and second end 36, with a hook assembly 38 attached to the second end 36. The first end 34 and the second end 36 each have a base pad 40 which are attached, typically by adhesives known in the art, to the surface of the tooth. The bridge assembly 30, when attached to the teeth, bridges or spans about two to four teeth. The purpose of the bridge assembly is to move the teeth, en masse, to correct for the Class II or Class III malocclusion.

Figure 8A:
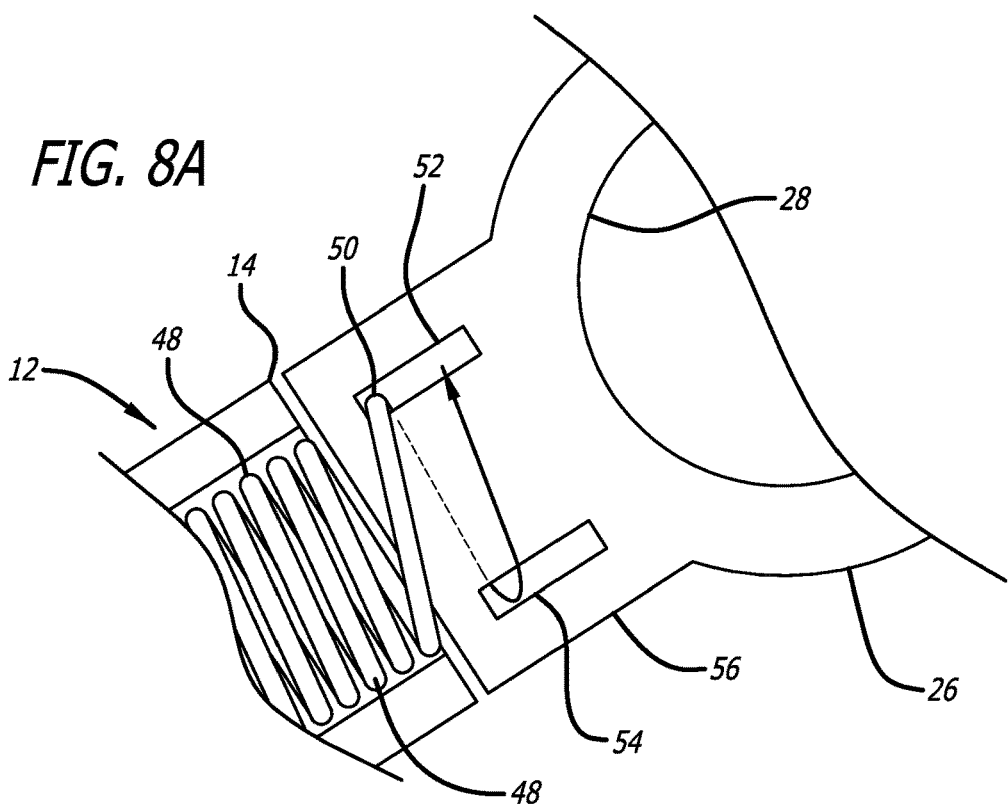
FIGS. 8A and 8B are enlarged plan views of a portion of the elongated member and the spring attached to the retaining member to create a gap.
Figure 8B:
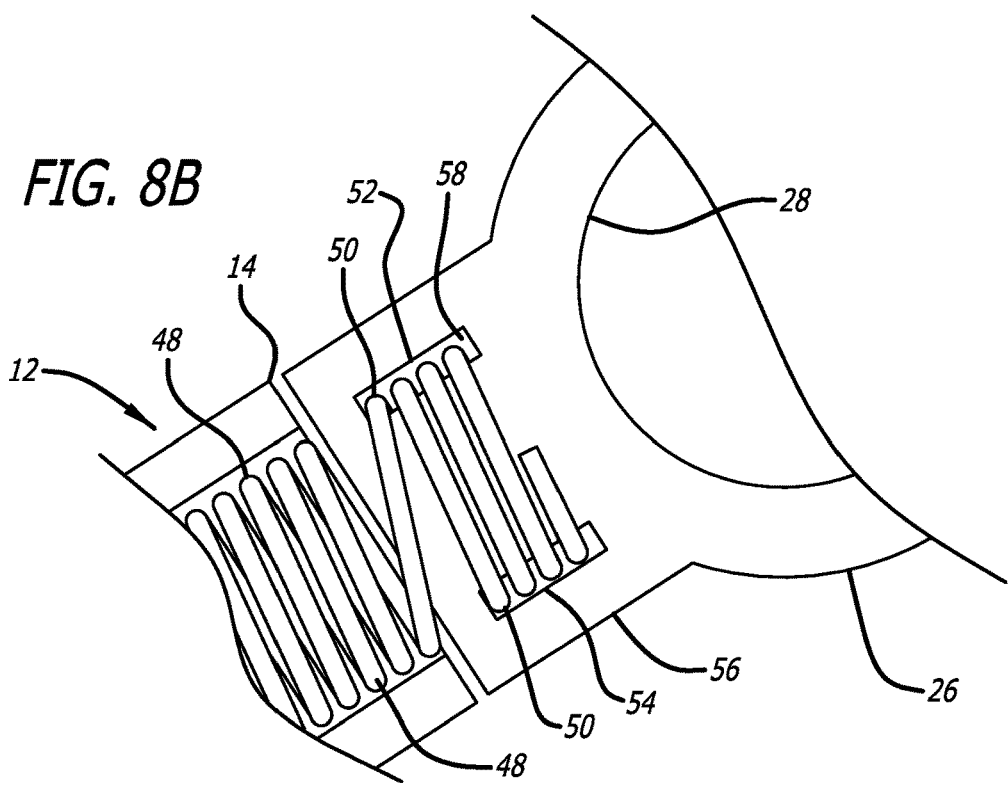

As further shown in FIGS. 4-8B, the elongated member 12, which is formed of a soft plastic material, has a spring member 42 that is attached to the elongated member. In one embodiment, the soft plastic material of the elongated member 12 is molded around a first portion 44 the spring member 42 so that a majority of the length of the spring member is contained within the soft plastic over mold of the elongated member 12. As shown more clearly in FIGS. 5-7, a plurality of coils 46 of the spring member 42 are spread apart to ensure a greater connection force with the molded plastic of the elongated member. The remaining coils are tightly wound coils 48, and from two to six tightly wound coils 50 extend from the distal end 14 of the elongated member 12 as shown in FIGS. 8A and 8B. The two to six tightly wound coils 50 are coiled or wound through a first slot 52 and a second slot 54 on tab 56 of the second retaining member 26. While the process of winding the two to six tightly would coils 50 through the first slot 52 and the second slot 54 of tab 56 is sufficient to securely attach the coils to the second retaining member 26, an adhesive welding, solder, brazing, or laser welding 58, or the like, can be used to permanently secure the attachment.

In one preferred embodiment, the spring member 42 is formed from a superelastic material such as NiTi (Nitinol®), Cu—Al—Ni, Fe-Mm-Si, Co—Cr—Ni, and ELGILOY®. The ELGILOY® consists of 39-41% cobalt, 19-21% chromium, 14-16% nickel, 11.3 to 20.5% iron, 6-8% molybdenum, and 1.5-2.5% manganese. The superelastic nature of the material provides a constant spring force over time for spring member 42. When spring member 42 is stretched, it will provide tension along its length that will remain constant over time, even if the overall length of the spring member 42 is reduced in length. Preferably, the spring member 42 exerts a constant force in range of 3 ounces to 12 ounces, and more preferably in the range of 7 to 9 ounces.

Figure 4:
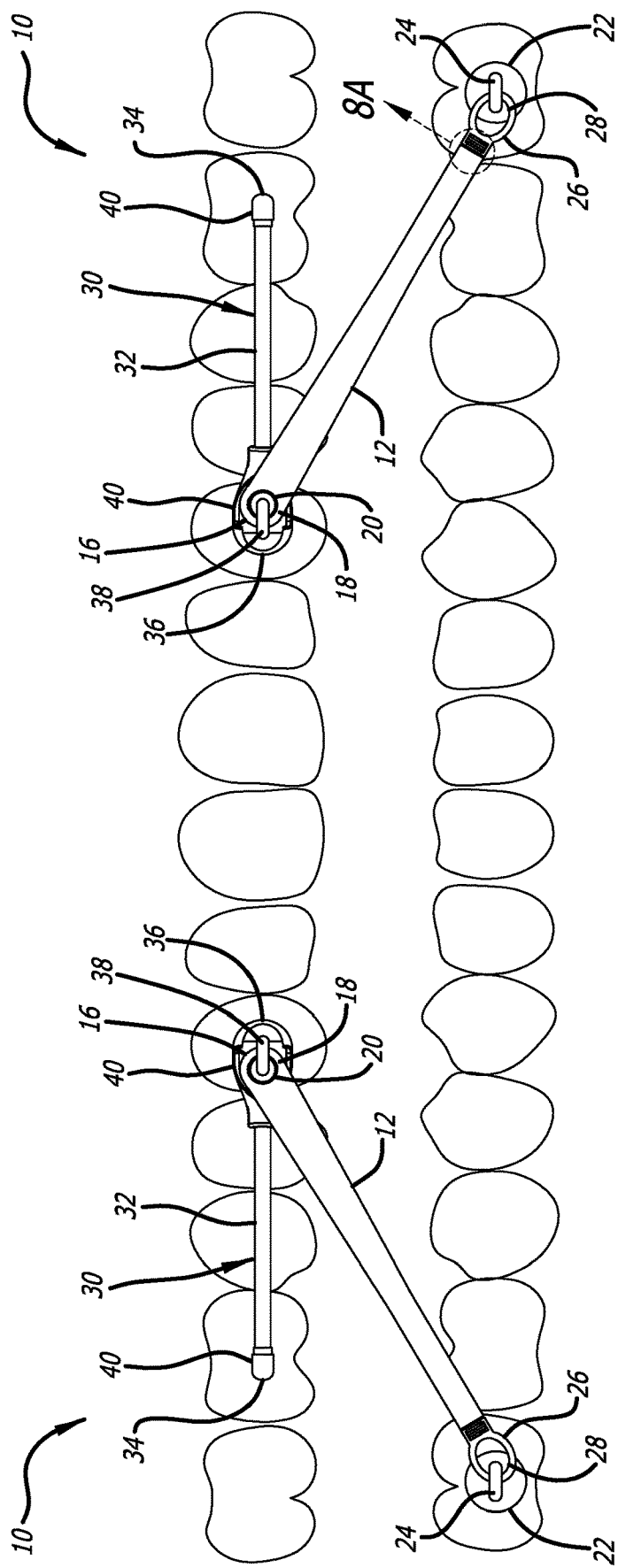
FIG. 4 is an elevational view of the orthodontic appliance assembly of the invention for treating a Class II malocclusion.
Figure 7:
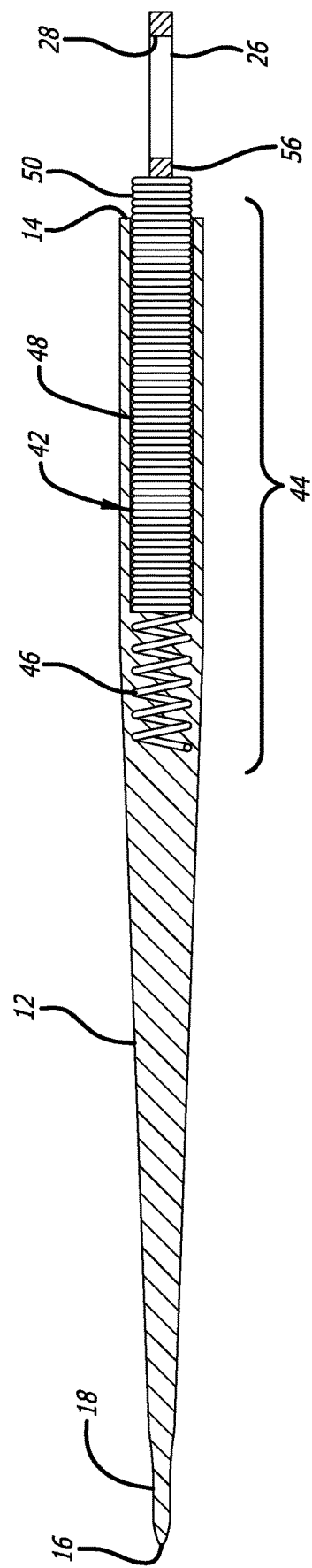
FIG. 7 is a side view of the elongated member of FIG. 5 depicting the end of the spring attached to a retaining member.

In order to treat a patient for a Class II malocclusion, as shown in FIGS. 4-6, the bridge assembly 30 is mounted on the upper arch or the upper 3 to 6 teeth in a known manner using adhesives. The anchor 22 is attached to the lower 7 tooth in known manner using adhesives. A Class III malocclusion is treated by mounting the bridge assembly on the teeth in the lower arch, in a known manner (not shown).

The elongated member 12 is then attached to the bridge assembly 30 by first hooking the first aperture 20 over the hook assembly 38. The elongated member 12 is then stretched by stretching spring member 42, and more precisely by stretching tightly wound coils 48, until the second aperture 28 is hooked over anchor hook 24. Due to the spring force of now stretched spring member 42, the elongated member is in tension so that the first retaining member 18 is being pulled toward the second retaining member 26, which in turn causes the bridge assembly 30 to move the teeth. Since the spring member 42 is formed from a superelastic material, the tension will remain constant during the treatment time. Since the movement of the teeth is constant, the treatment time is dramatically reduced and the patient is able to miss one or more visits to the orthodontist.

One important feature of the invention is to preprogram the movement of the orthodontic appliance assembly 10 to stop at a prescribed distance. As shown more clearly in FIGS. 5 and 6, there is a gap 60 between the distal end 14 of the elongated member 12, and mesial end 62 of tab 56. The size of the gap 60 is preprogramed as the spring member 42 elongates when the elongated member 12 is attached to the bridge assembly 30 and the anchor 22. In one embodiment, the gap 60 is precalibrated to be from 1.0 mm to 12.0 mm. In another embodiment, the gap 60 is precalibrated to be from 1.0 mm to 5.0 mm. In another embodiment, the gap is precalibrated to be from 1.0 mm to 3.0 mm. In one embodiment, the gap 60 is precalibrated to be 2.0 mm. As the orthodontic treatment period progresses, the bridge assembly 30 imparts force to the teeth and moves the teeth, en masse, a prescribed distance to correct the Class II or Class III malocclusion. The distance the teeth move is slightly less than the distance of gap 60. As an example, if the gap 60 is set at 3.0 mm, the bridge assembly 30 and the teeth will move a distance less than 3.0 mm, more in the range of 2.6 mm to 2.9 mm. With routine visits to the orthodontist, the movement of the teeth can be accurately and precisely monitored.

Figure 9A:
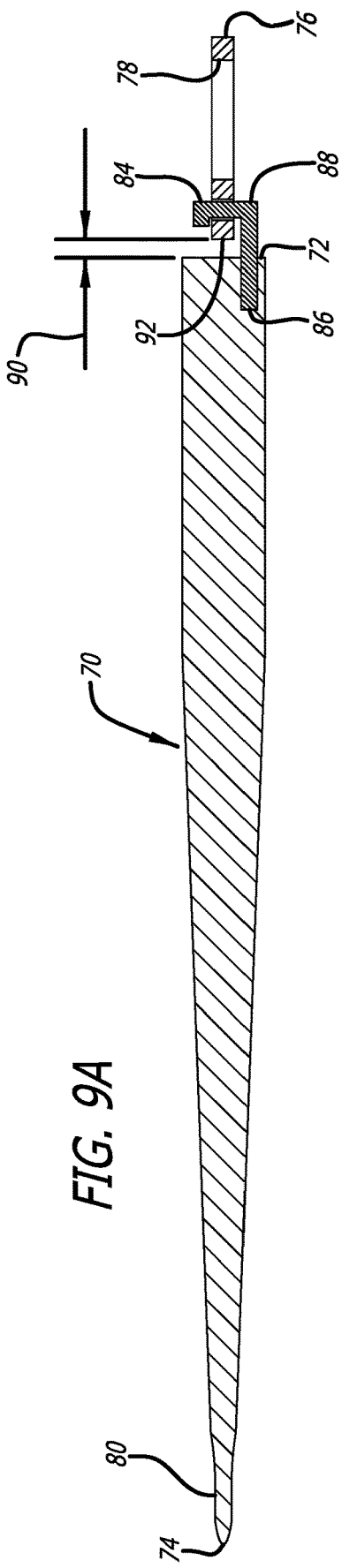
FIG. 9A is a side view of an alternative embodiment of an elongated elastic member attached to a retaining member and creating a gap.
Figure 9B:
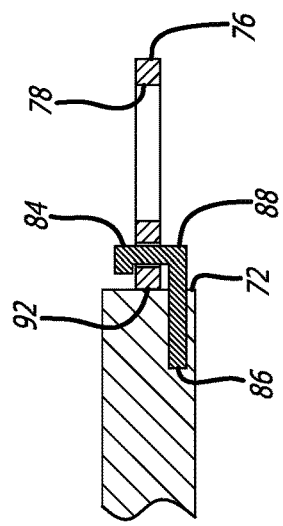
FIG. 9B is a side view of a portion of the elongated elastic member of FIG. 9A depicting the gap being closed.
Figure 9C:
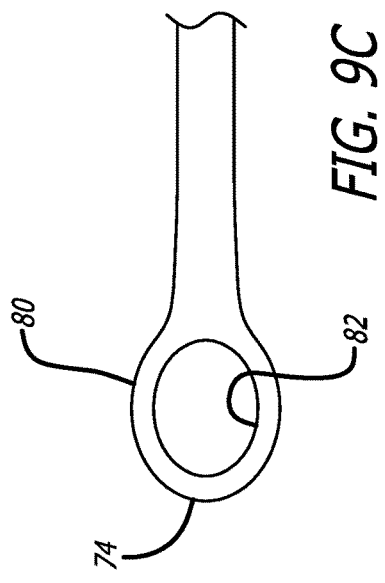
FIG. 9C is a plan view of the mesial end of the elongated elastic member and the second retaining member.

In another embodiment, shown in FIGS. 9A-9C, an elongated elastic member 70 is used to provide the tension on the bridge assembly 30. The elongated elastic member 70 has a distal end 72 and a mesial end 74 and is tapered along its length. A first retaining member 76 is attached to the distal end 72 and has a first aperture 78 for removable attachment to the hook 24 of anchor 22. A second retaining member 80 is attached to the mesial end 74 and has a second aperture 82 for removable attachment to the hook assembly 38 on the bridge assembly 30. The elongated elastic member 70 is formed from a stretchable polymer such as a cross-linked hydrophobic gel. The elongated elastic member 70 is attached to the bridge assembly 30 and anchor 22 and stretched in the process in order to create tension along the length of the elongated elastic member. More specifically, the first aperture 78 is hooked over the anchor hook 24 and then the elongated elastic member is stretched so that the second aperture 82 can be hooked over the hook assembly 38 of the bridge assembly 30. A support member 84 has a first end 86 that is attached to the distal end 72 of the elongated elastic member 70, and a second end 88 that is attached to the first retaining member 76. A gap 90 is formed between the distal end 72 of the elongated elastic member 70 and a mesial surface 92 and as the tension in the elongated elastic member 70 begins to cause movement of the teeth attached to the bridge assembly 30, the gap 90 will begin to narrow until the distal end 72 contacts the mesial surface thereby stopping the movement of the teeth. In one embodiment, the gap 90 is precalibrated to be from 1.0 mm to 12.0 mm. In another embodiment, the gap 90 is precalibrated to be from 1.0 mm to 5.0 mm. In another embodiment, the gap is precalibrated to be from 1.0 mm to 3.0 mm. In one embodiment, the gap 90 is precalibrated to be 2.0 mm. As the orthodontic treatment period progresses, the bridge assembly 30 imparts force to the teeth and moves the teeth, en masse, a prescribed distance to correct the Class II or Class III malocclusion. The distance the teeth move is slightly less than the distance of gap 90. As an example, if the gap 90 is set at 3.0 mm, the bridge assembly 30 and the teeth will move a distance less than 3.0 mm, more in the range of 2.6 mm to 2.9 mm. With routine visits to the orthodontist, the movement of the teeth can be accurately and precisely monitored.

After the gap 90 is closed, the elongated elastic member 70 is removed from the anchor 22 and the bridge assembly 30 by the orthodontist and a new elongated elastic member 70 installed to continue treatment if necessary. This procedure is repeated until the Class II or Class III malocclusion is corrected.

In both the embodiments shown in FIGS. 4-8B and FIGS. 9A-9C, compliance by the patient to continually replace elastics between visits to the orthodontist is unnecessary because only the orthodontist can install or remove the elongated member 12 or the elongated elastic member 90.

In another embodiment, as shown in FIGS. 10-18E, an orthodontic appliance assembly 110 (sometimes referred to herein as a non-compliant motion device) includes an elongated member 112 having a distal end 114 and mesial end 116. A first retaining member 118 is attached to the mesial end 116 of the elongated member and has a first aperture 120 for engaging an anchor assembly 138. A second retaining member 126 on the distal end 114 of the elongated member 112 has a second aperture 128 for engaging an anchor 122. The anchor 122 is typically attached to either an upper molar (upper 6 or upper 7) or a lower molar (lower 6 or lower 7). The anchor 122 typically is attached by adhesives in a known manner and has a hook 124 for engaging the second aperture 128 of the second retaining member 126. The bridge assembly 130 comprises an elongated rod 132 having a first end 134 and second end 136, with the anchor assembly 138 attached to the second end 136. The first end 134 and the second end 136 each have a base pad 140A, 140B, which are attached, typically by adhesives known in the art, to the surface of the tooth. The bridge assembly 130, when attached to the teeth, bridges or spans about two to four teeth. The purpose of the bridge assembly is to move the teeth, en masse, to correct for the Class II or Class III malocclusion.

The anchor assembly 138 includes two embodiments. First, in FIGS. 10-14F, the anchor assembly 138 has a cap 142 with a post 144 attached to and extending from the cap 142. The post 144 extends through an aperture 146 in the base pad 140B. The post 144 has multiple slits 148 along the circumference of the post 144, and a locking ridge 130 at the open end 152 of the post. In order to attach the elongated member 112 to the bridge assembly 130, the cap 138 is positioned over the aperture 146 in the base pad 140B so that the orthodontist can insert the post 144 through the first aperture 120 of the elongated member 112 and into aperture 146. As the orthodontist pushes on the cap 142, a locking ridge 150 at the open end 152 of the post 144 engages a ledge 154 in the base pad 140B, thereby locking the anchor assembly 138 to the base pad 140B and attaching the elongated member 112 to the bridge assembly 130. The post 144 extends through the first aperture 120 on the bridge assembly 130 to attach the bridge assembly 130 to the elongated member 112. When treatment is completed, an orthodontic tool is wedged under the cap 142 to force the locking ridge 150 on the post 144 to release from the ledge 154 in the base pad 140B.

In a second embodiment of the anchor assembly 138, as shown in FIGS. 15-18E, the base pad 140B has a fixed post 160 extending therefrom and is configured to receive retainer 162. The fixed post 160 has a recessed section 164 that is configured to mattingly receive an arcuate section 166 which has a diameter 168 that is slightly smaller than a diameter 170 of the recessed section 164. To attach the elongated member 112 to the bridge assembly 130, the first aperture 120 is positioned over the fixed post 160 and the orthodontist then positions the retainer 162 so that the arcuate section 166 aligns with the recessed section 164 in the fixed post 160. The orthodontist then forcefully pushes the retainer 162 so that the arcuate section 166 snaps around and locks onto the recessed section 164 thereby retaining and attaching the elongated member 112 to the bridge assembly 130. In one embodiment, shown in FIGS. 18A-18E, the anchor assembly 138 is further secured to the base pad 140B by inserting tabs 172 into slots 174 in the base pad 140B. The tabs 172 have latches 176 that snap into ports 178 on the base pad 140B to removably attach the retainer 162 to the base pad 140B, and hence attach the elongated member 112 to the bridge assembly 130.

The two embodiments of the anchor assembly 138 shown in FIGS. 1-18E are preferably molded from a polymer material in a known manner. Also, it contemplated that the anchor assembly 138 can be machined from a polymer material or a metal alloy in a known manner.

In an alternative embodiment, shown in FIGS. 19A-19D, an anchor assembly 196 is configured to removably attach to an arm 198 which has a base pad 200 and a hook assembly 202. It is preferred that the based pad 200 and hook assembly 202 be a single molded part, however, they can be separate parts fastened together by known means such as adhesives. The anchor assembly 196 has a labial surface 206, a buccal surface 208 (facing the teeth) and an opening 210 configured to receive the hook assembly 202. The hook assembly 202 includes a hook 212 having a first end 214, and a second end 216 attached to a top surface 218 of the hook assembly 202. The labial surface 206 of the anchor assembly 196 has a recess 220 configured to receive the first end 214 of the hook 212. There is a gap 222 between the first end 214 and the recess 220 so that the second retaining member 26 (FIG. 5) can be pulled through the gap 222 and captured by the hook 212 during treatment. The gap 222 is smaller than the nominal diameter of the second retaining member 26 so that it has to be slightly stretched when forcibly pulled through the gap 222. The diameter of the second retaining member 26 might be reduced when stretched making it easier to pull it through the gap 222. After the second diameter retaining member 26 is mounted on the hook 212, it is difficult to remove by accident.

The hook assembly 202 is inserted into the opening 210 of the anchor assembly 196 by snapping it in place. As shown more clearly in FIG. 19D, the anchor assembly 196 has an arcuate section 224 on the buccal surface 208 that is configured to receive the arm 198 and hook assembly 202. The arcuate section has a first ridge 226 and a second ridge 228 spaced apart a distance that is less than the diameter of the arm 198 thereby creating an interference fit during assembly. The arm 198 must be forcibly snapped into the arcuate section 224 by moving past the first ridge 226 and the second ridge 228. The arm 198, and hence the anchor assembly 196, will remain firmly attached to each other during treatment. The anchor assembly 196 can be formed of a metal or metal alloy commonly known and used in the orthodontic field.

Figure 10:
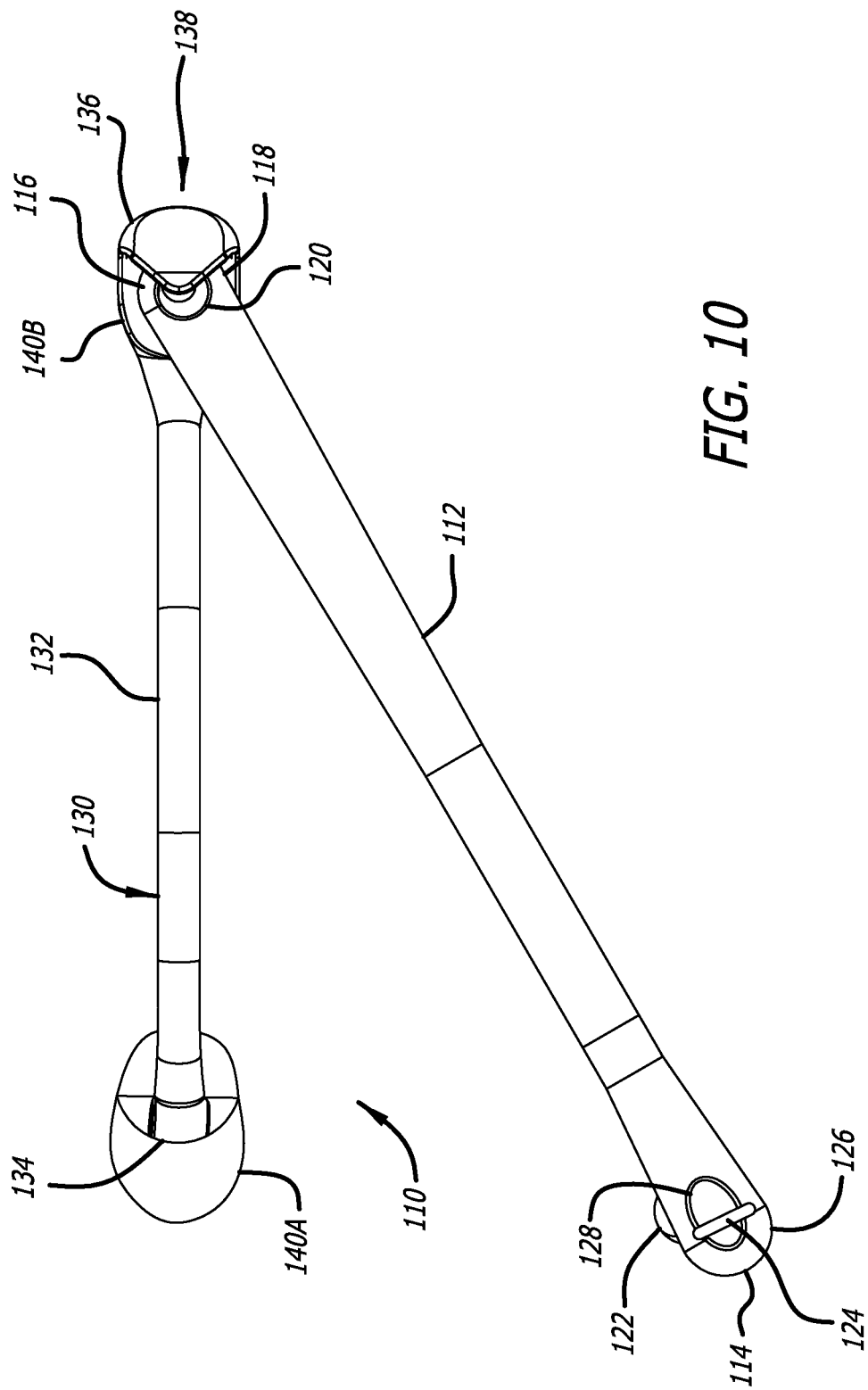
FIG. 10 is an elevational view of the orthodontic assembly having a removable cap for attaching the elongated member to the bridge assembly.
Figure 11:
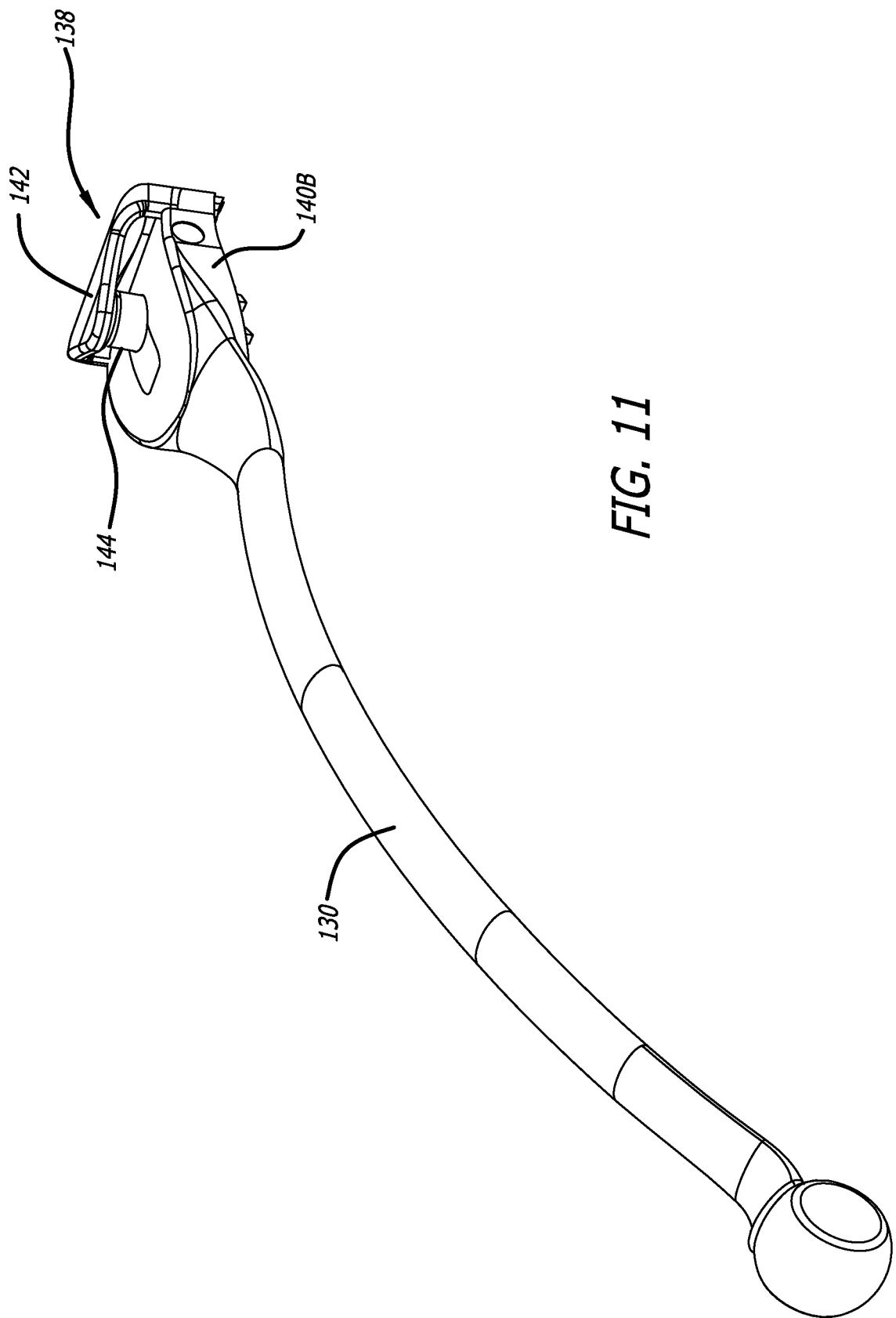
FIG. 11 is a top perspective view of the orthodontic assembly having a removable cap for attaching the elongated member to the bridge assembly.
Figure 12:
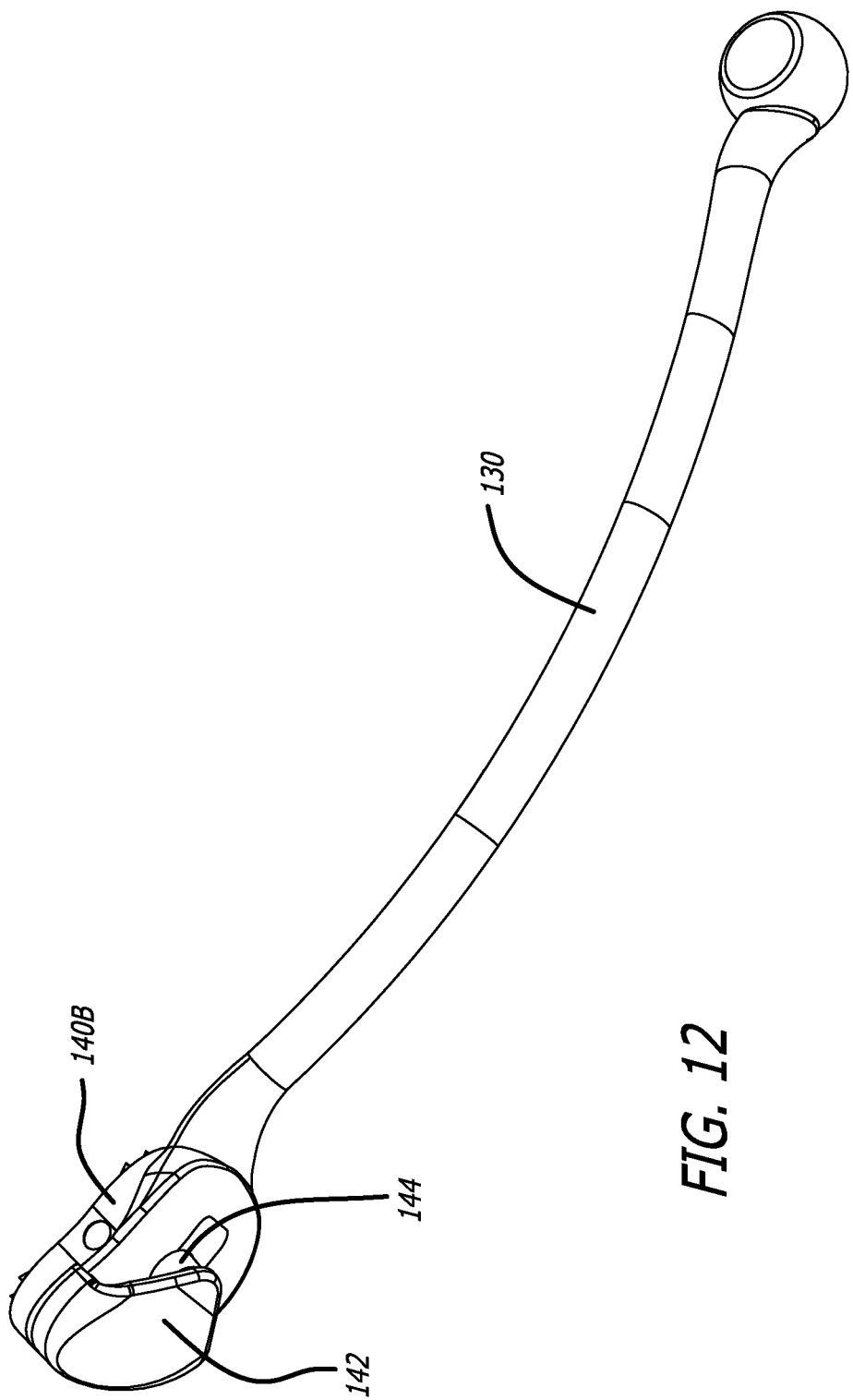
FIG. 12 is a side perspective view of the orthodontic assembly having a removable cap for attaching the elongated member to the bridge assembly.
Figure 13:
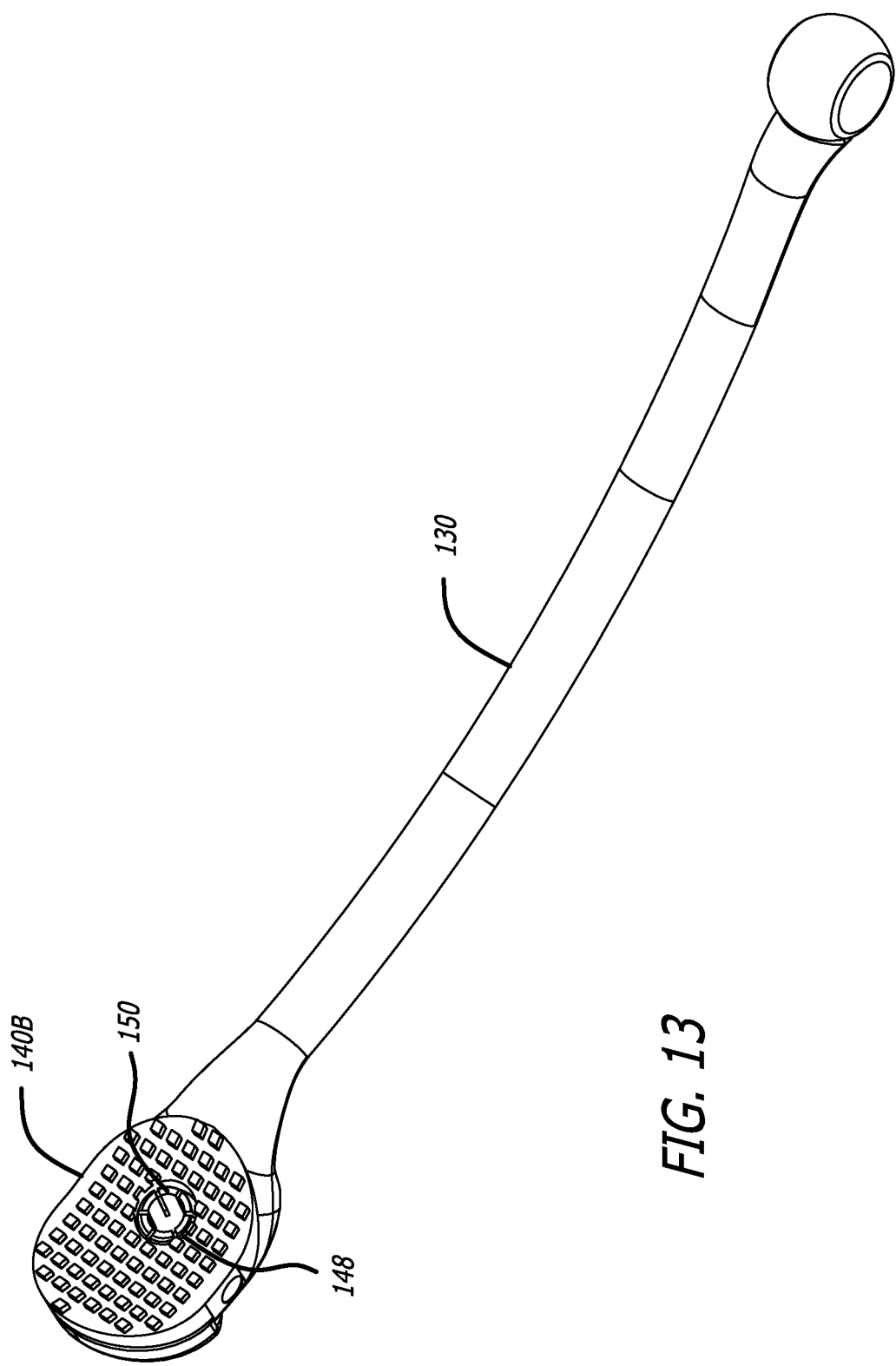
FIG. 13 is a bottom view of the orthodontic assembly having a removable cap for attaching the elongated member to the bridge assembly.
Figure 14A:
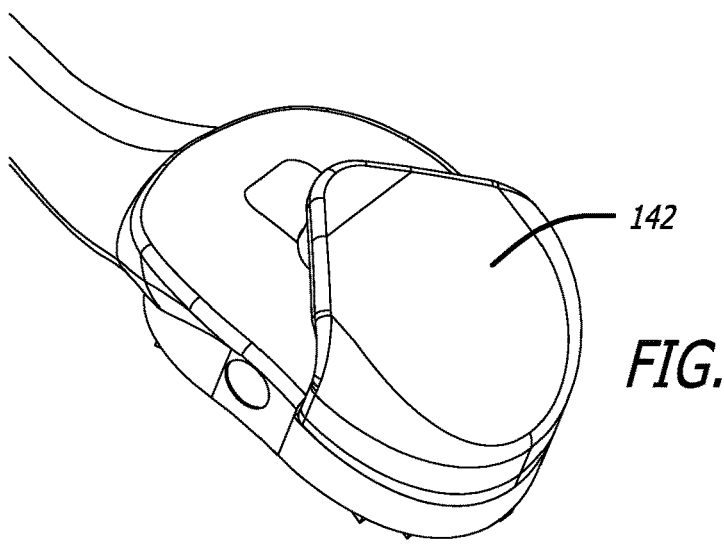
FIG. 14A is an enlarged, partial top perspective view of the orthodontic assembly having a removable cap for attaching the elongated member to the bridge assembly.
Figure 14B:
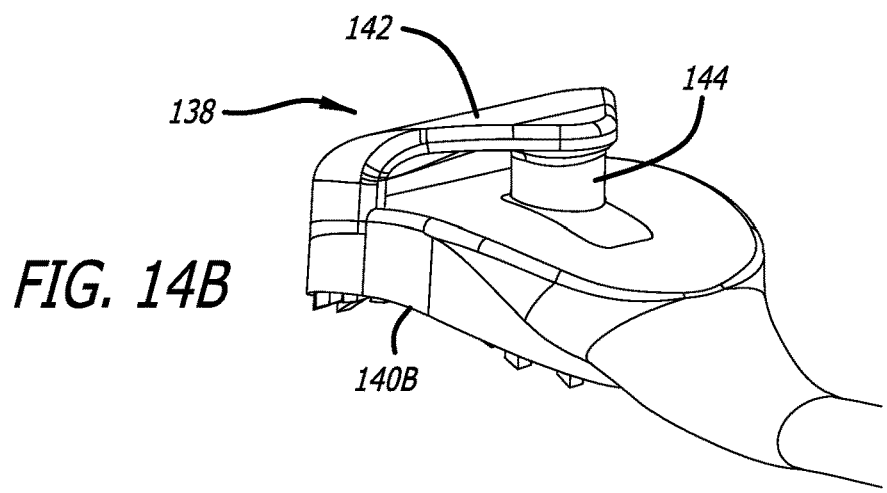
FIG. 14B is an enlarged, partial side perspective view of the orthodontic assembly having a removable cap for attaching the elongated member to the bridge assembly.
Figure 14C:
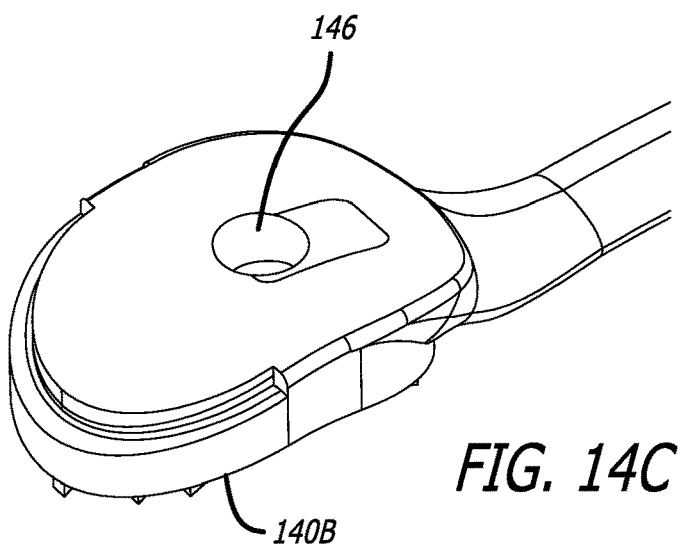
FIG. 14C is an enlarged, partial end perspective view of the base pad depicting an aperture.
Figure 14D:
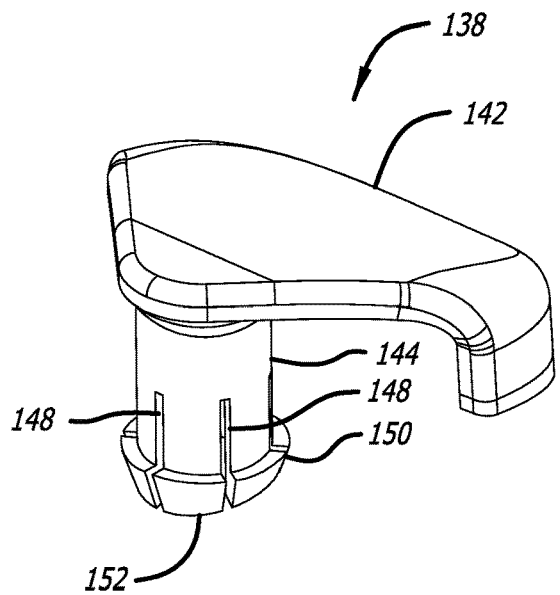
FIG. 14D is an enlarged, partial side view of the cap and post for attachment to the base pad.
Figure 14E:
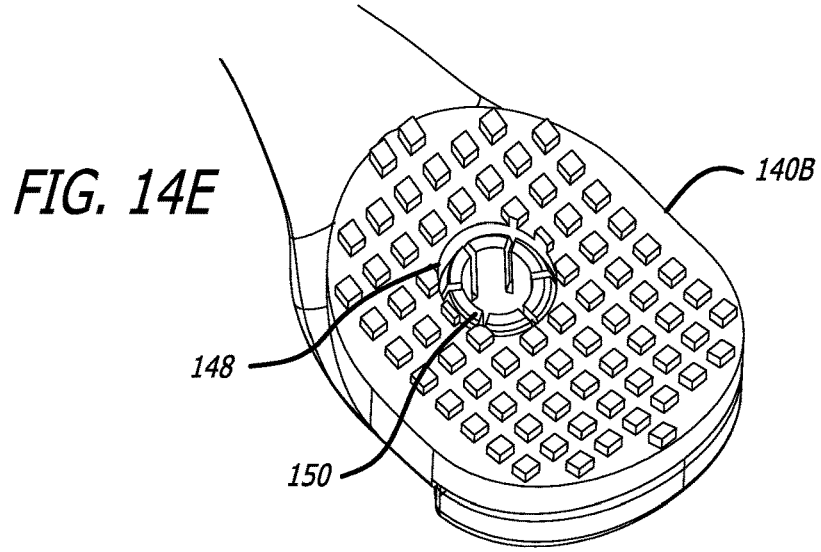
FIG. 14E is an enlarged, partial bottom view of the base pad with the post inserted.
Figure 14F:
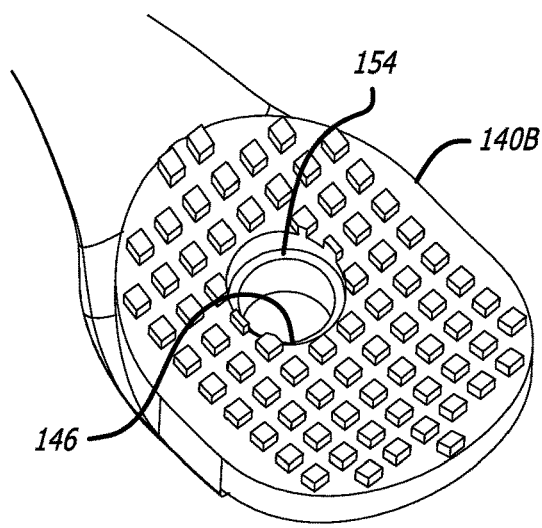
FIG. 14F is an enlarged, partial bottom view of the base pad without the post.
Figure 15:
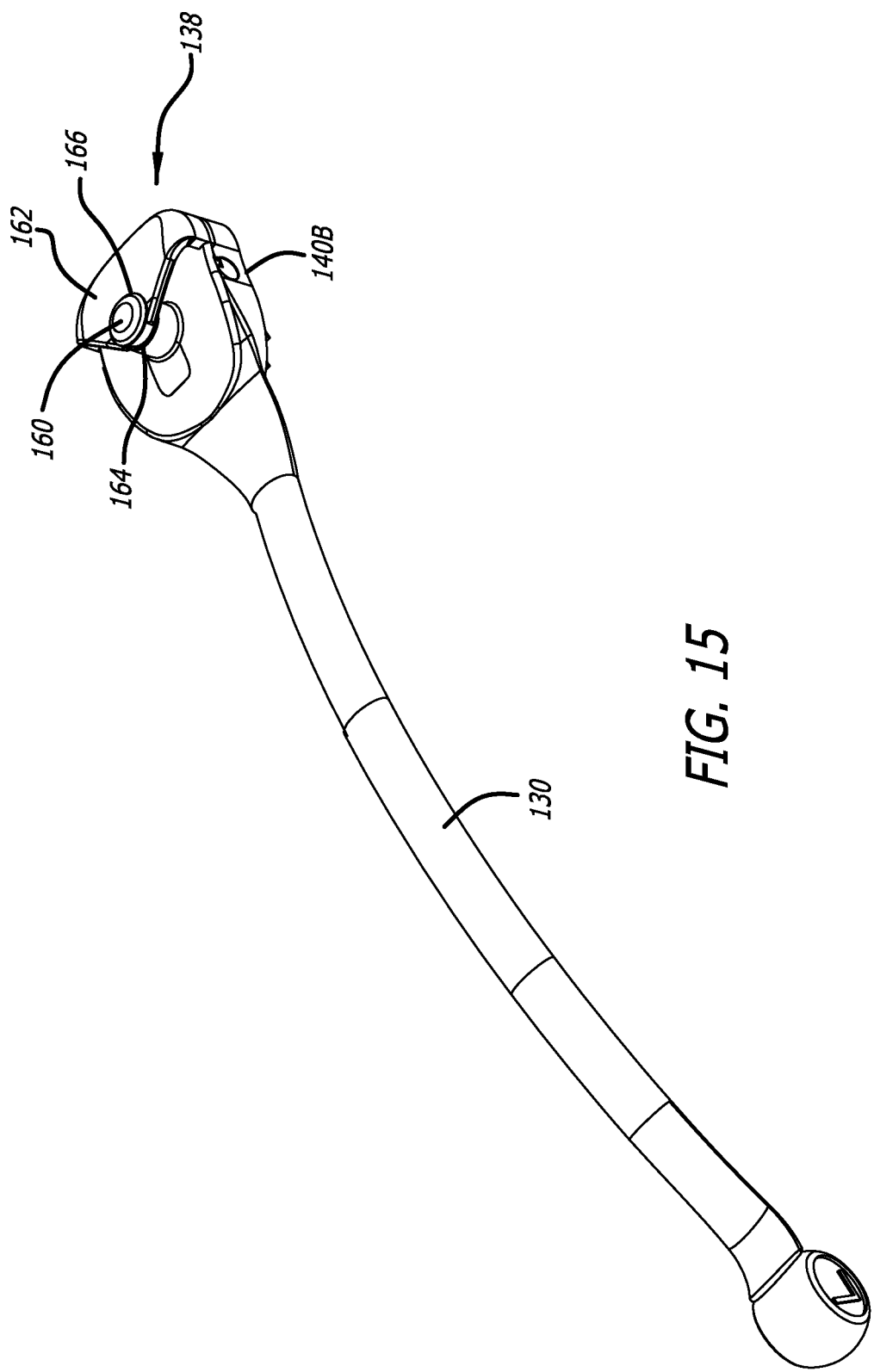
FIG. 15 is a top perspective view of the orthodontic assembly having a removable cap for attaching the elongated member to the bridge assembly.
Figure 16:
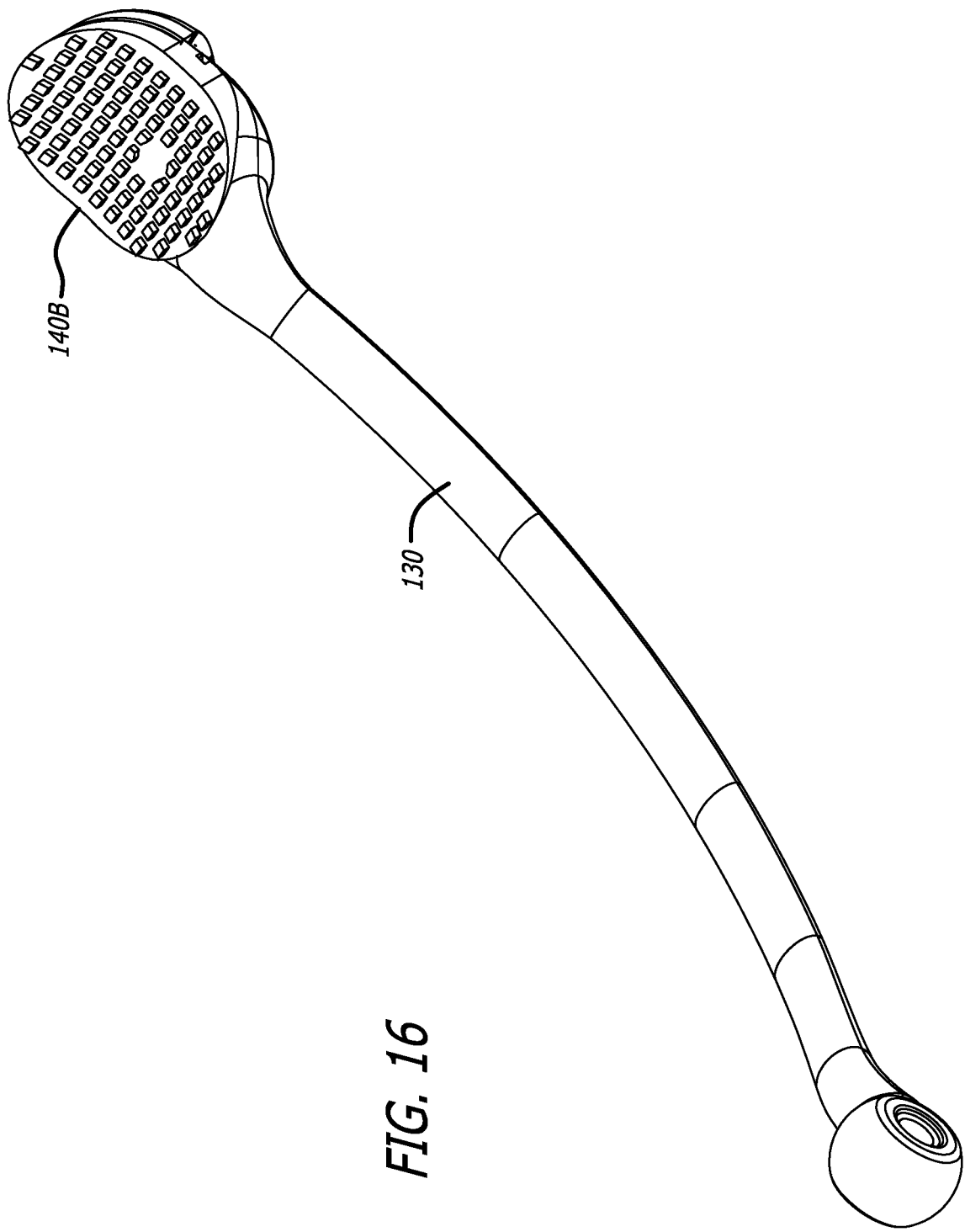
FIG. 16 is a bottom perspective view of the orthodontic assembly having a removable cap for attaching the elongated member to the bridge assembly.
Figure 17:
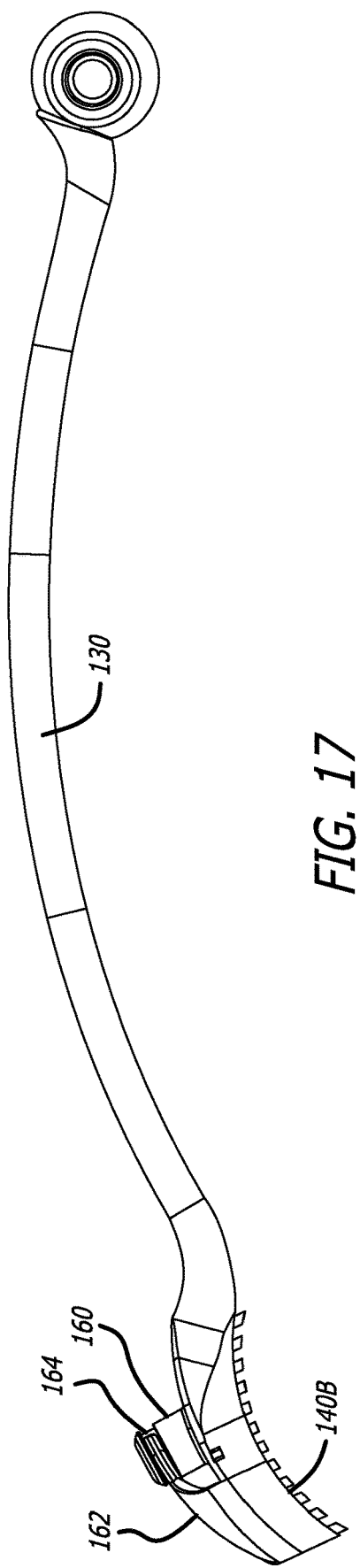
FIG. 17 is a side view of the orthodontic assembly having a removable cap for attaching the elongated member to the bridge assembly.
Figure 18A:
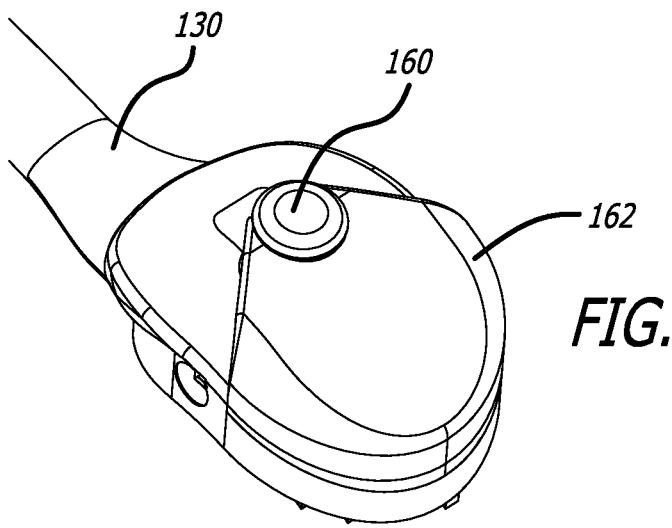
FIG. 18A is an enlarged, partial top perspective view of the orthodontic assembly having a removable cap for attaching the elongated member to the bridge assembly.
Figure 18B:
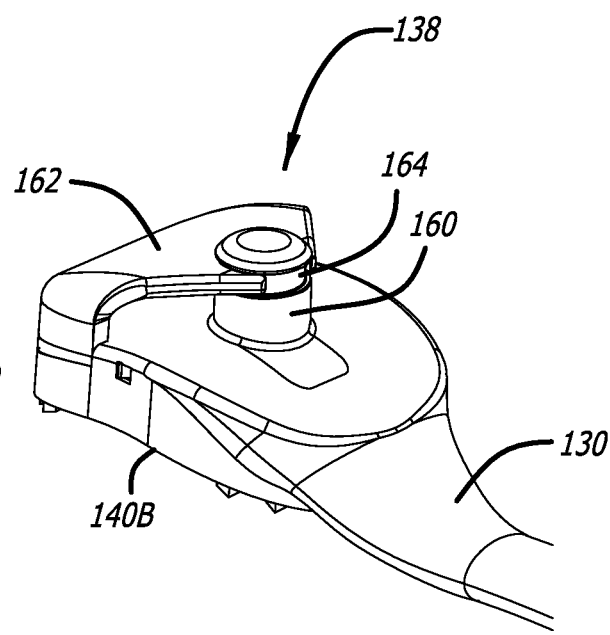
FIG. 18B is an enlarged, partial side perspective view of the orthodontic assembly having a removable cap for attaching the elongated member to the bridge assembly.
Figure 18C:
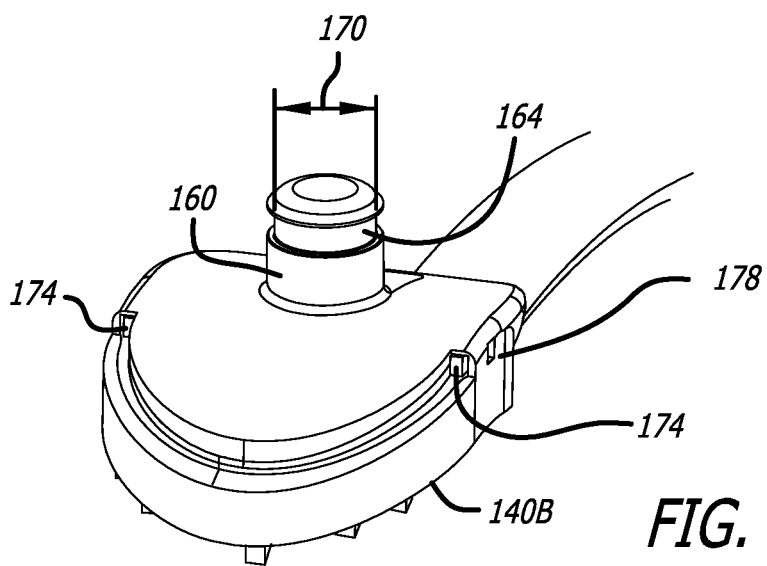
FIG. 18C is an enlarged, partial end perspective view of the base pad depicting a fixed post.
Figure 18D:
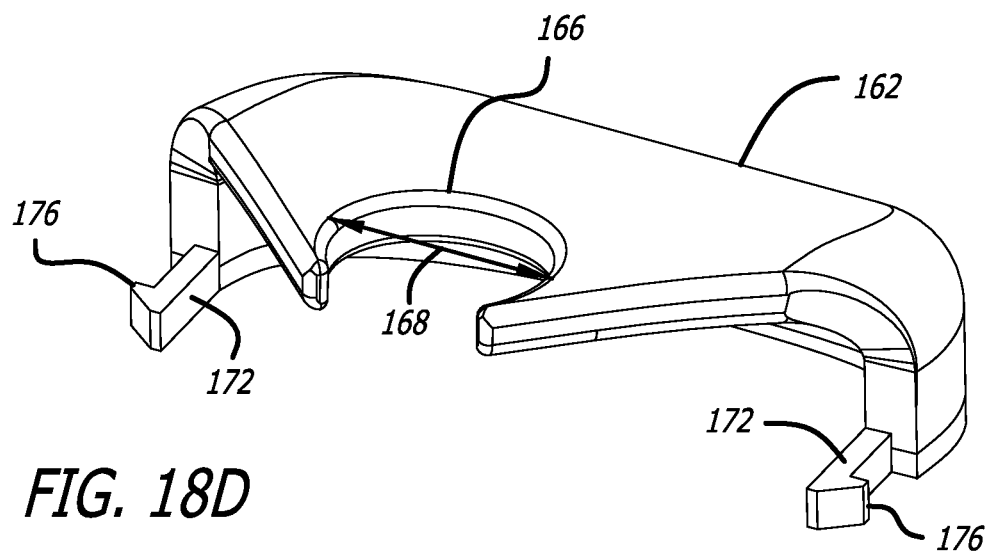
FIG. 18D is an enlarged, partial side perspective view of the retaining cap and the arcuate section.
Figure 18E:
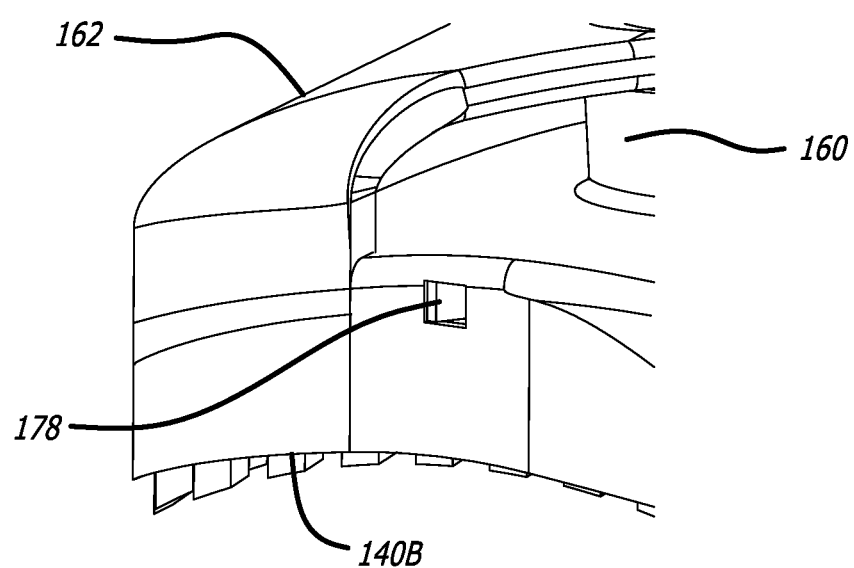
FIG. 18E is an enlarged, partial side view of the base pad.
Figure 19A:
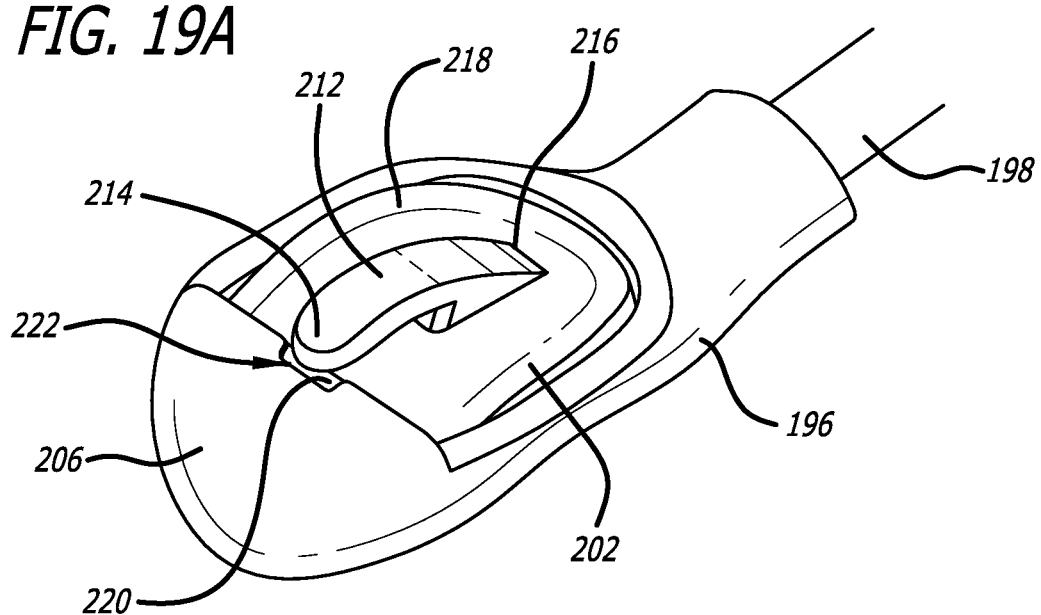
FIG. 19A is a partial top perspective view depicting the arm, anchor assembly, and hook assembly.
Figure 19B:
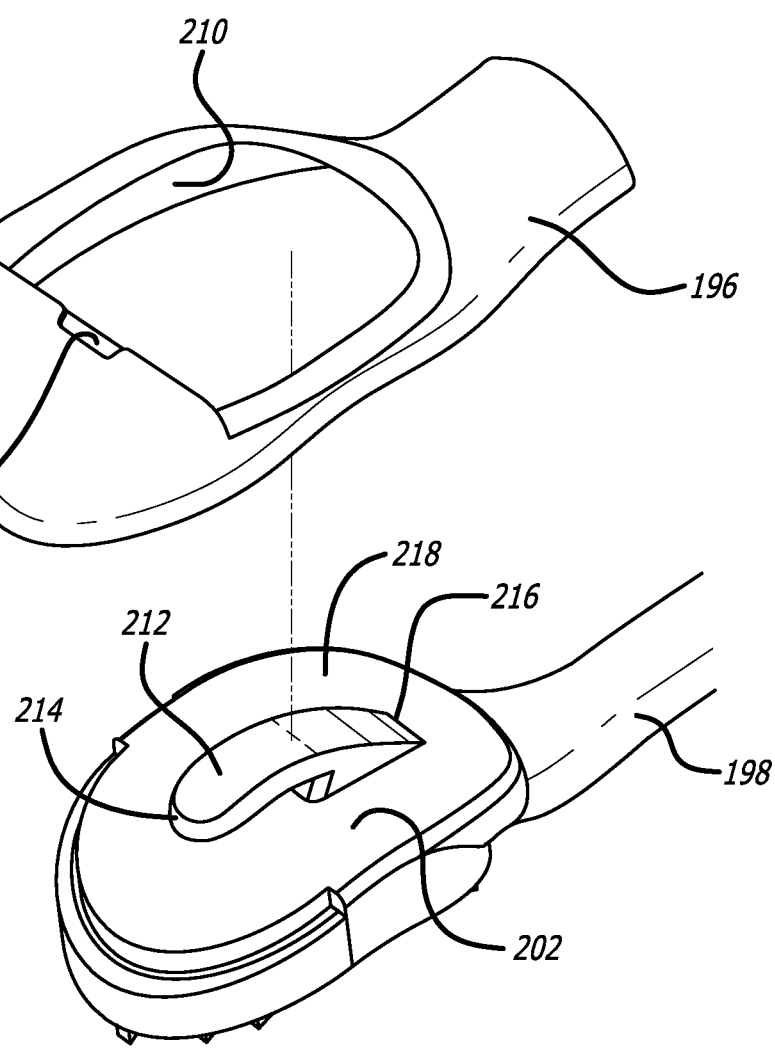
FIG. 19B is an exploded view depicting the hook assembly and the anchor assembly.
Figure 19C:
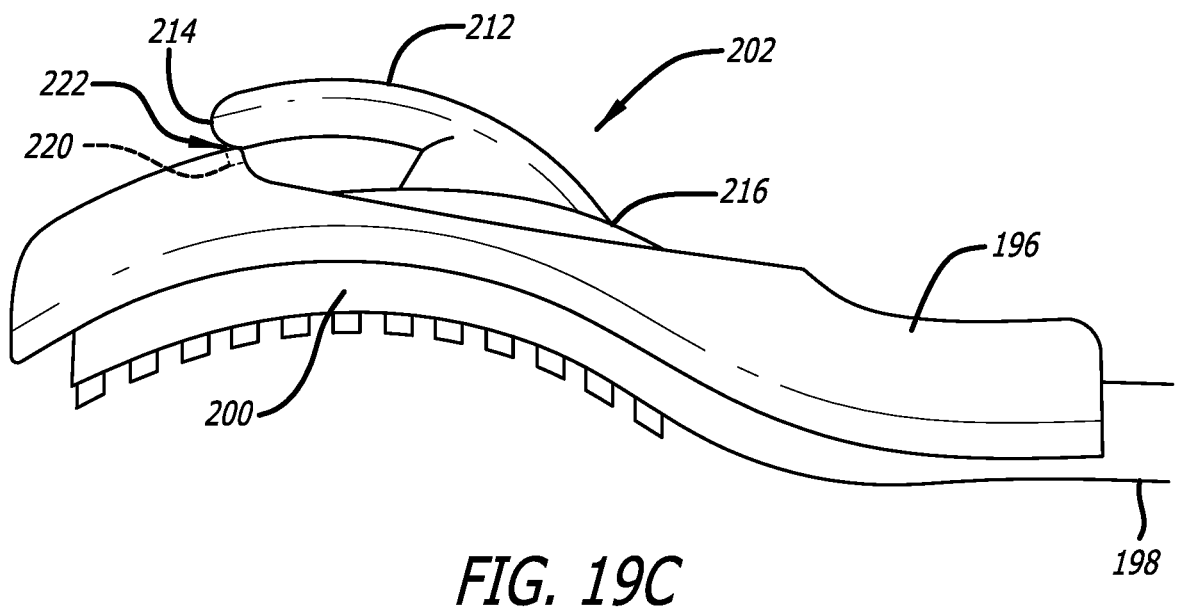
FIG. 19C is a partial side view depicting the arm, anchor assembly, and hook assembly.
Figure 19D:
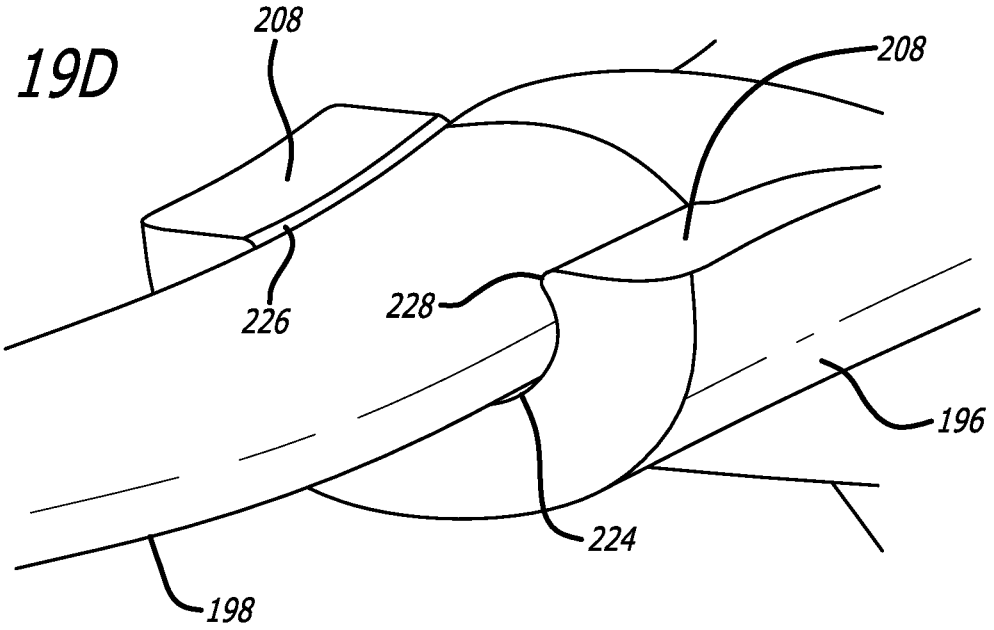
FIG. 19D is a partial end view of the buccal side of the anchor assembly depicting an arcuate section receiving the arm.

The anchor assembly 196 can be used with any of the foregoing bridge assembly 130 embodiments disclosed herein such as shown for example in FIG. 10.

While the orthodontic appliance assembly disclosed herein has been described to treat Class II and Class III malocclusions, its use is not so limited. The materials and dimensions disclosed herein are by way of example and may vary depending on patient needs and requests by orthodontists.

We claim:

1. An orthodontic appliance assembly, comprising:
   an elongated member having a distal end and a mesial end;
   an elastic member, a mesial portion of the elastic member being contained within the elongated member;
   a first retaining member attached to the mesial end of the elongated member and having a first aperture for removable attachment to a bridge assembly;
   a second retaining member indirectly attached to the distal end of the elongated member through the elastic member and having a second aperture for removable attachment to an anchor;
   a distal end of the elastic member being attached to the second retaining member,
   wherein a constant tension force is created on the bridge assembly by the elastic member being stretched axially when the first retaining member is removably attached to the bridge assembly and the second retaining member is removably attached to the anchor;
   wherein a preprogrammed gap is formed between the distal end of the elongated member and a mesial surface of the second retaining member when the elastic member is stretched; and
   wherein the constant tension force pulls the first retaining member and the second retaining member toward each other and thereby applying the constant tension force to the anchor and the bridge assembly so that over time, the preprogrammed gap will close as the distal end of the elongated member contacts the mesial surface of the second retaining member.

2. The orthodontic appliance assembly of claim 1, wherein the elastic member is pre-calibrated to provide the constant tension force.

3. The orthodontic assembly of claim 2, wherein the elastic member is formed from a metal alloy.

4. The orthodontic assembly of claim 3, wherein the metal alloy is taken from the group of stretchable metal alloys including stainless steel, NiTi, CuAl—Ni, Cu—Ni—Ti, Fe—Mn—Si, Co—Cr—Ni, and Elgiloy.

5. An orthodontic appliance assembly, comprising:
an elongated member having a distal end and a mesial end;
a first retaining member attached to the mesial end of the elongated member and having a first aperture for engaging a bridge assembly;
a second retaining member indirectly attached to the distal end of the elongated member having a second aperture configured for engaging anchor;
a spring member associated with the elongated member to provide a constant tension force pulling the first retaining member and the second retaining member toward each other and thereby applying the constant tension force to the anchor and the bridge assembly;
wherein a preprogrammed gap is formed between the distal end of the elongated member and a mesial surface of the second retaining member when the spring member is stretched, so that over time, the preprogrammed gap will close as the distal end of the elongated member contacts the mesial surface of the second retaining member; and
wherein the elongated member comprises a molded portion that is molded around a mesial section of the spring member so that the mesial section of the spring member is encased in the elongated member, and
a distal end of the spring member is attached to the mesial surface of the second retaining member.

6. The orthodontic appliance assembly of claim 5, wherein the spring member is pre-calibrated to provide the constant tension force.

7. The orthodontic appliance assembly of claim 6, wherein the spring member is pre-calibrated to move the first retaining member and the second retaining member a predetermined distance toward each other.

8. The orthodontic appliance assembly of claim 7, wherein the molded portion is a tubular portion.

9. The orthodontic appliance assembly of claim 8, wherein two to six coils of the spring member are coiled onto the second retaining member.

10. The orthodontic appliance assembly of claim 8, wherein two to six coils of the spring member are attached to the second retaining member.

11. The orthodontic appliance assembly of claim 10, wherein the two to six coils of the spring member are attached to the second retaining member by any of adhesives, welding, laser welding, solder, overmolding, and brazing.

12. The orthodontic appliance assembly of claim 5, wherein the spring member is formed from a superelastic material.

13. The orthodontic appliance assembly of claim 12, wherein the superelastic material is taken from the group of materials including NiTi, Cu—Al—Ni, CuNiTi, Fe—Mn—Si, and Co—Cr—Ni alloy.

14. The orthodontic appliance assembly of claim 12, wherein the superelastic material consists of 39-41% cobalt, 19-21% chromium, 14-16% nickel, 11.3 to 15.5% iron, 6-8% molybdemum, and 1.5-2.5% manganese.

15. The orthodontic appliance assembly of claim 5, wherein as the spring member is stretched, the preprogrammed gap widens between the distal end of the elongated member and the mesial surface of the second retaining member.

16. The orthodontic appliance assembly of claim 15, wherein the preprogrammed gap is a precalibrated distance in the range from 1.0 mm to 12.0 mm.

17. The orthodontic appliance assembly of claim 15, wherein the preprogrammed gap is a precalibrated distance in the range from 1.0 mm to 3.0 mm.

18. The orthodontic appliance assembly of claim 5, wherein the second aperture is configured to removably engage the anchor.

19. The orthodontic appliance assembly of claim 18, wherein the anchor to which the orthodontic appliance assembly is configured to attach to further comprises an arm and a hook assembly.

20. The orthodontic appliance assembly of claim 19, wherein the hook assembly includes a hook having a first end and a second end attached to the hook assembly.

21. The orthodontic appliance assembly of claim 20, wherein the anchor has a recess that is adjacent to, but not contacting, the first end of the hook.

22. The orthodontic appliance assembly of claim 21, wherein the hook assembly is inserted into an opening in the anchor.

23. The orthodontic appliance assembly of claim 22, wherein the anchor has an arcuate section and a first ridge spaced apart from a second ridge.

24. The orthodontic appliance assembly of claim 23, wherein the hook assembly has a tubular arm that is configured to be snapped into the arcuate section by sliding past the first ridge and the second ridge in an interference fit.

* * * * *